US012792274B2

(12) United States Patent
Mulani et al.

(10) Patent No.: US 12,792,274 B2
(45) Date of Patent: *Nov. 10, 2026

(54) DATA LAYOUT CONFIGURATIONS FOR ACCESS OPERATIONS

(71) Applicant: Micron Technology, Inc., Boise, ID (US)

(72) Inventors: Jameer Mulani, Bangalore (IN); Amiya Banerjee, Bangalore (IN); Nitul Gohain, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,898

(22) Filed: Jul. 10, 2025

(65) Prior Publication Data

US 2025/0383820 A1 Dec. 18, 2025

Related U.S. Application Data

(63) Continuation of application No. 18/513,310, filed on Nov. 17, 2023, now Pat. No. 12,366,995.

(60) Provisional application No. 63/430,768, filed on Dec. 7, 2022.

(51) Int. Cl.
*G06F 3/06* (2006.01)

(52) U.S. Cl.
CPC .......... *G06F 3/0659* (2013.01); *G06F 3/0625* (2013.01); *G06F 3/0656* (2013.01); *G06F 3/0683* (2013.01)

(58) Field of Classification Search
CPC .... G06F 3/0659; G06F 3/0625; G06F 3/0656; G06F 3/0683; G06F 3/061; G06F 3/0679
See application file for complete search history.

(56) References Cited

U.S. PATENT DOCUMENTS

| | | | |
|---|---|---|---|
| 10,732,877 | B1 | 8/2020 | Gopalakrishnan et al. |
| 2019/0102102 | A1 | 4/2019 | Natarajan et al. |

*Primary Examiner* — Jason W Blust
(74) *Attorney, Agent, or Firm* — Holland & Hart LLP

(57) ABSTRACT

Methods, systems, and devices for data layout configurations for access operations are described. The memory system may write data to a first set of memory cells using a first write operation having a first type of layout for mapping the data to physical addresses of the memory system in response to receiving a write command. The first set of memory cells may be written to as single-level cells (SLCs), multi-level cells (MLCs), or triple-level cells (TLCs). The memory system may transfer the data to a second set of memory cells of the memory system using a second write operation having the first type of layout. The second set of memory cells may be written to as quad-level cells (QLCs). The memory system may read the data from the second set of memory cells using a read operation having a second type of layout different than the first type of layout.

20 Claims, 7 Drawing Sheets

DATA LAYOUT CONFIGURATIONS FOR ACCESS OPERATIONS

CROSS REFERENCE

The present Application for Patent is a continuation of U.S. patent application Ser. No. 18/513,310 by Mulani et al., entitled "DATA LAYOUT CONFIGURATIONS FOR ACCESS OPERATIONS," filed Nov. 17, 2023, which claims priority to and the benefit of U.S. Provisional Patent Application No. 63/430,768 by Mulani et al., entitled "DATA LAYOUT CONFIGURATIONS FOR ACCESS OPERATIONS," filed Dec. 7, 2022, each of which is assigned to the assignee hereof, and each of which is expressly incorporated by reference in its entirety herein.

FIELD OF TECHNOLOGY

The following relates to one or more systems for memory, including data layout configurations for access operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
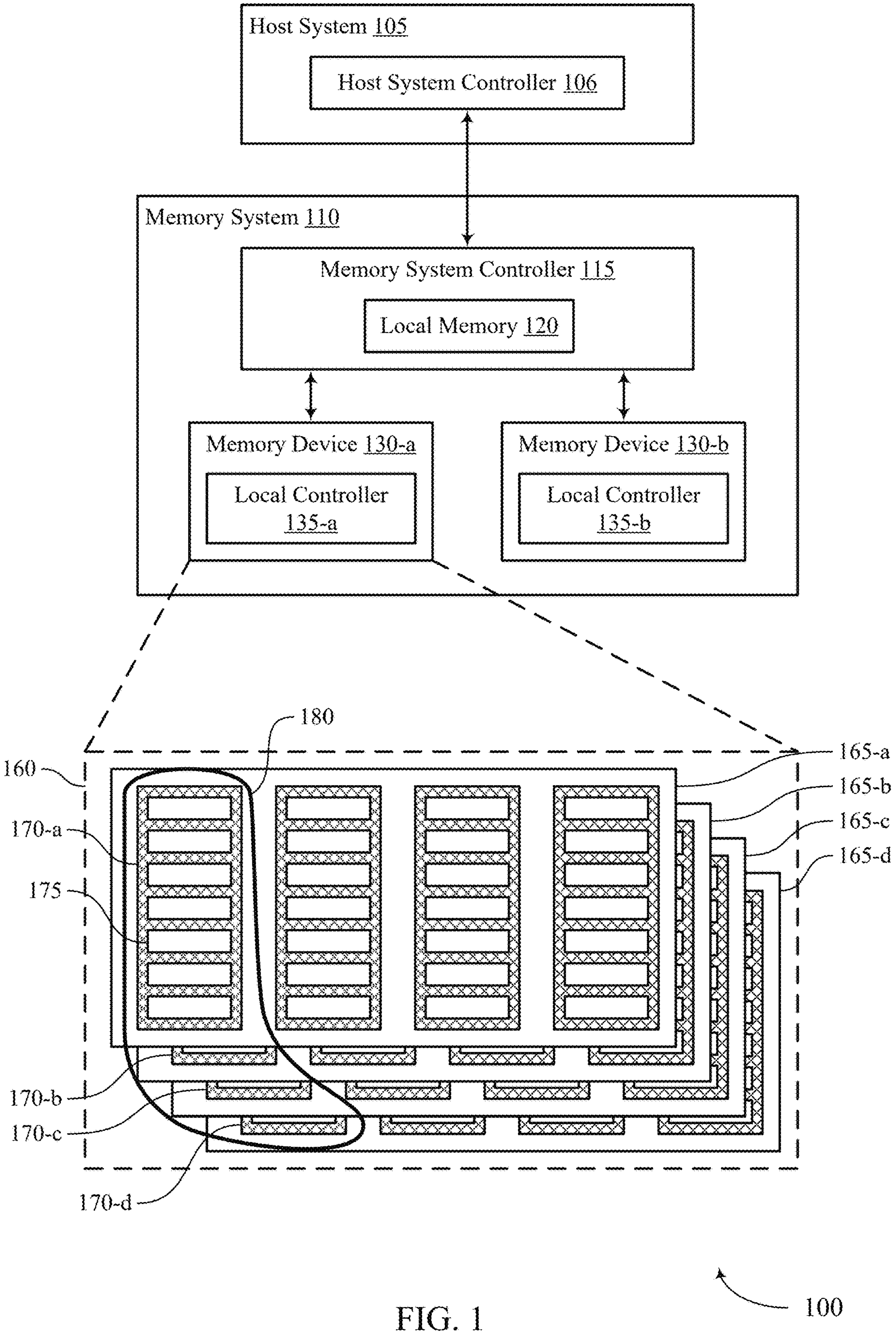
FIG. 1 illustrates an example of a system that supports data layout configurations for access operations in accordance with examples as disclosed herein.

Some memory systems may include multiple memory devices along with a memory system controller configured to manage the multiple memory devices. For example, a system that includes multiple not-and (NAND) memory devices (e.g., dies including NAND memory cells, which may be referred to as NAND dies) and a memory system controller may be referred to as a managed NAND (mNAND) system. In some cases, the memory system controller may be configured to exchange signaling with a host system for the memory devices and exchange related signaling with the memory devices. For example, the host system may send commands to the memory system controller (e.g., read or write commands). Thus, the memory devices may perform, in response to the commands issued by the memory system controller, various operations to satisfy the corresponding host-issued commands (e.g., reading and writing data).

In some examples, a memory system may write data in accordance with a big-z data layout scheme which may benefit from a host sequential write operation that may take advantage of multi-channel and multi-die NAND topology. For example, the big-z layout scheme may utilize a write operation that sequentially writes data across multiple dies of a memory system, such that each die may write the data to respective memory cells in parallel. In some cases, using a write operation conducive to the big-z data layout may increase the write buffer size used for performing the write operation. For example, big-Z write operations can write a larger amount of data in a sequential matter, which may mean that the buffer that stores the data before the write operation is larger to accommodate the larger amounts of data. As such, an increase in write buffer size may use a larger amount of static random access memory (SRAM) associated with the memory system. Additionally, or alternatively, the type of memory cell used to store data may increase the size of the write buffer. For example, a quad-level cell (QLC) may store more data relative to other memory cell types (e.g., a single-level cell (SLC), a multi-level cell (MLC), or a triple-level cell (TLC)). As such, the amount of the SRAM allocated to big-Z writes for QLC memory cells may introduce undesirable complexity and cost that may be unsustainable for some memory systems.

As described herein, the memory system may first write data using a little-z data layout scheme that may have a smaller buffer size relative to the big-z data layout scheme, and therefore use less SRAM. Additionally, or alternatively, the memory system may write to a first set of memory cells (e.g., SLCs, MLCs, or TLCs) which may be associated with a smaller buffer and faster write operation relative to QLCs. As such, the data may stay stored in the first set of memory cells until the memory system enters an idle state. In some examples, in the background (e.g., during idle time of the memory system), the data may be transferred from the first set of memory cells to a second set of memory cells (e.g., QLCs). During the transfer operation, the memory system controller may reorder the data such that during a second write operation the data may be configured to have a big-z data layout scheme to be used in future read operations. More specifically, the second write operation may use little-z data layout scheme to reduce a size of the write buffer. However, the data may ordered in the little-z data layouts such that the resulting data stored in the QLC memory cells is in a big-z data layout. In some examples, the second write operation may still use a little-z write operation, and the reordering operation may result in the big-z data layout scheme for future read operations. As such, the memory system controller may use a read operation that uses the big-z layout scheme. The techniques described herein, allows the memory system to use a smaller write buffer size in accordance with writing data using little-z data layout schemes as well as the efficiency of reading data in accordance with a big-z data layout scheme.

Figure 2:
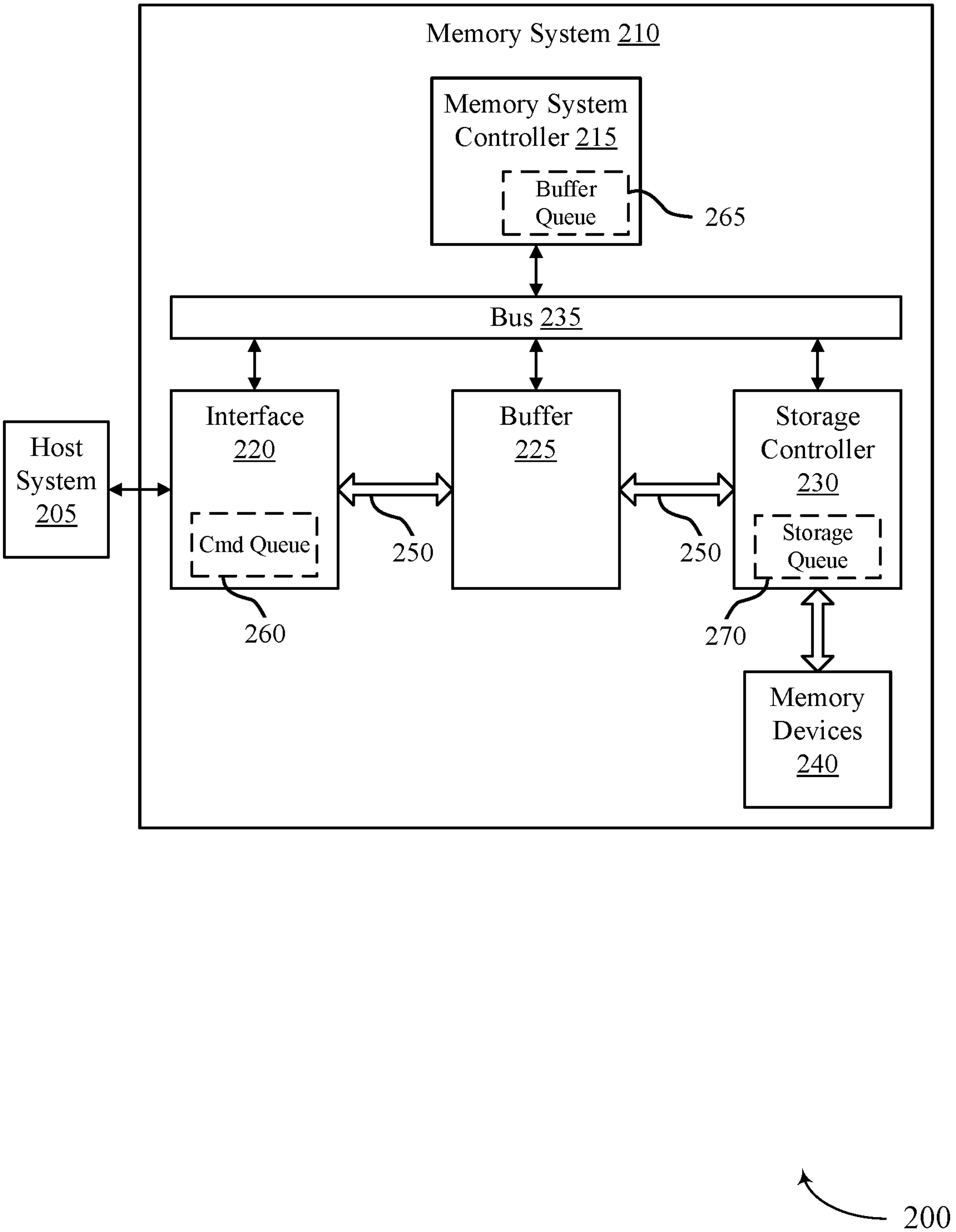
FIG. 2 illustrates an example of a system that supports data layout configurations for access operations in accordance with examples as disclosed herein.
Figure 3:
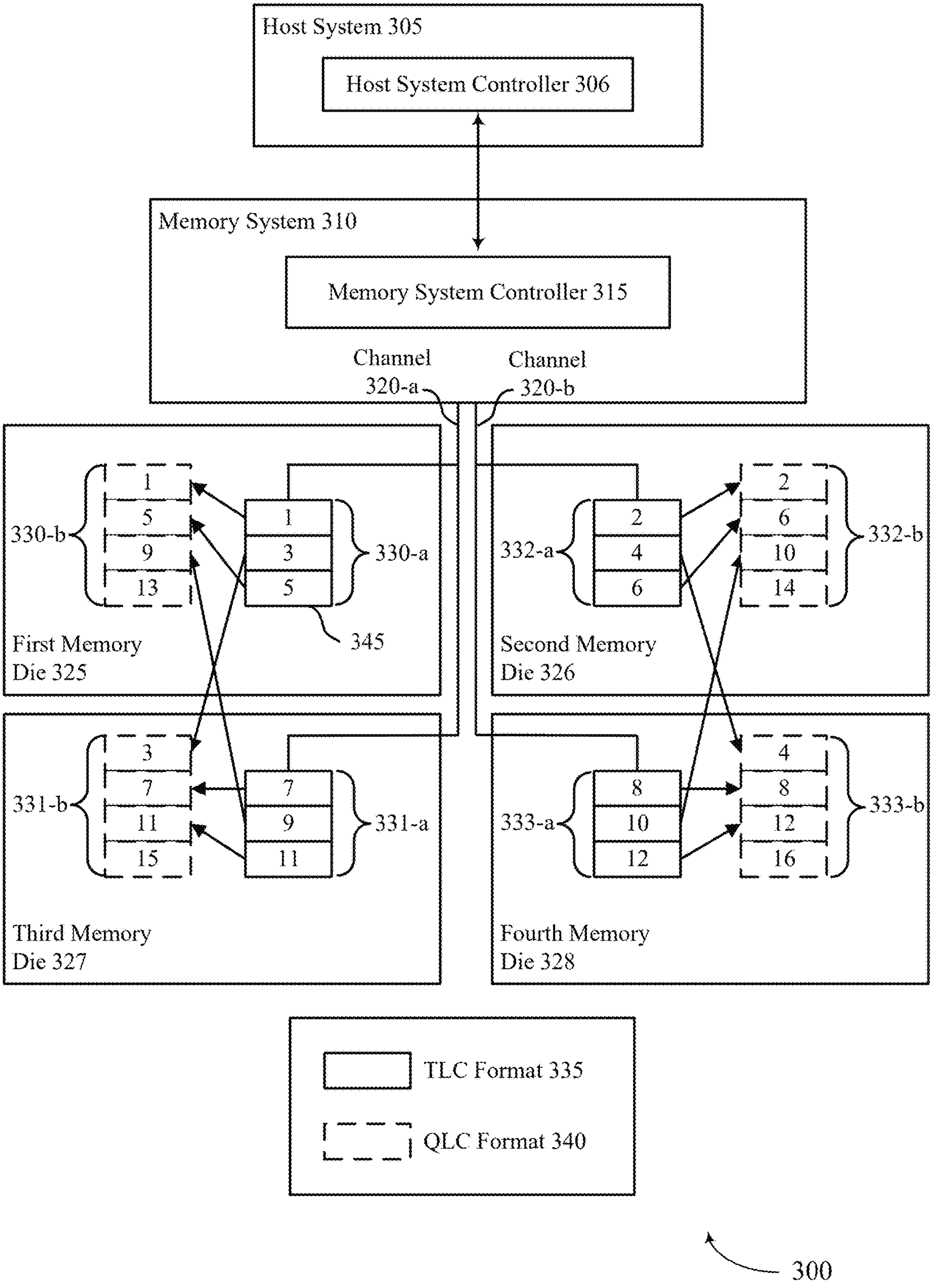
FIG. 3 illustrates an example of a system that supports data layout configurations for access operations in accordance with examples as disclosed herein.

Features of the disclosure are initially described in the context of systems, devices, and circuits with reference to FIGS. 1 through 3. Features of the disclosure are described in the context of data layout schemes and process flows with reference to FIGS. 4 and 5. These and other features of the disclosure are further illustrated by and described in the context of an apparatus diagram and flowchart that relate to data layout configurations for access operations with reference to FIGS. 6 and 7.

FIG. 1 illustrates an example of a system 100 that supports data layout configurations for access operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, SRAM or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally, or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an mNAND system.

The system 100 may include any quantity of non-transitory computer readable media that support data layout configurations for access operations. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may first write data using a little-z data layout scheme which may have a smaller buffer size relative to the big-z data layout scheme. In such examples, the write buffer may be allocated as a portion of the SRAM of the memory system and the size of the write buffer for little-z write operations may be smaller than the size of the write buffer for big-z write operations. Additionally, or alternatively, the memory system may receive a write command from a host system and may write the data initially to a first set of memory cells (e.g., SLCs, MLCs, or TLCs). Writing to initially the first set of memory cells (e.g., SLCs, MLCs, or TLCs) may be associated with a smaller write buffer and faster write operation relative to QLCs. As such, the data may stay stored in the first set of memory cells until the memory system enters an idle state. In some examples, in the background (e.g., during idle time of the memory system), the data may be transferred (e.g., as part of a transfer operation) from the first set of memory cells to a second set of memory cells (e.g., QLCs). During the transfer operation, the memory system controller 115 may reorder the data such that during a second write operation the data may have be configured to have a big-z data layout scheme to be used in future read operations. More specifically, the second write operation may use little-z data layout scheme to reduce a size of the write buffer. However, the data may ordered in the little-z data layouts such that the resulting data stored in the QLC memory cells is in a big-z data layout. In some examples, the second write operation may still use a little-z write operation, and the reordering operation may result in the big-z data layout scheme. As such, the memory system controller 115 may use a read operation that uses the big-z layout scheme generated during the transfer operation. The techniques described herein, allows the memory system 110 to benefit from the reduced size of a write buffer associated with little-z data layouts and TLC memory cells in accordance with first writing data as well as the efficiency of reading data in accordance with a big-z data layout scheme.

FIG. 2 illustrates an example of a system 200 that supports data layout configurations for access operations in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received in response to the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) in response to the the data transfer to the buffer 225 has being completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the memory system 210 may first write data using a little-z data layout scheme which may have a smaller buffer size relative to the big-z data layout scheme, and therefore use less SRAM. Additionally, or alternatively, the memory system may write to a first set of memory cells (e.g., SLCs, MLCs, or TLCs) which may be associated with a smaller buffer and faster write operation relative to QLCs. As such, the data may stay cached in the first set of memory cells until the memory system enters an idle state. In some examples, in the background (e.g., during idle time of the memory system), the data may be transferred (e.g., as part of a transfer operation) from the first set of memory cells to a second set of memory cells (e.g., QLCs). During the transfer operation, the memory system controller 215 may reorder the data such that during a second write operation the data may have a big-z data layout scheme. In some examples, the second write operation may still use a little-z write operation, and the reordering operation may result in the big-z data layout scheme. As such, the memory system controller 215 may use a read operation that uses the big-z layout scheme generated during the transfer operation. The techniques described herein, allows the memory system 210 to benefit from the reduced buffer size in accordance with first writing data as well as the efficiency of reading data in accordance with a big-z data layout scheme.

FIG. 3 illustrates an example of a system 300 that supports data layout configurations for access operations in accordance with examples as disclosed herein. In some examples, system 300 may be implemented by one or more aspects of systems 100 and/or 200. For instance, system 300 may include a host system 305, a host system controller 306, a memory system 310, and a memory system controller 315 which may be respective examples of the host system 105, the host system controller 106, the memory system 110, and the memory system controller 115 with reference to FIG. 1. As such, the host system controller 306 may be coupled with the memory system controller 315 via a respective physical host interface included in the memory system 310, or via a respective physical host interface. In some examples, the memory system 310 may receive a write command from the host system 305 to write data to the memory system 310. In such examples, the system 300 may operate in accordance with the techniques described herein to write the data in accordance with a first data layout (e.g., a little-z layout) and, during an idle period of the memory system 310, perform a transfer operation to transfer the data to a second data layout (e.g., a big-z layout).

In some examples, the memory system 310 may be associated (e.g., coupled) with one or more channels 320 which may facilitate the transfer of data to one or more memory cells of the memory system 310. In the example of FIG. 3, the memory system 310 may include a channel 320-*a* associated with a first memory die 325 and a third memory die 327 of the memory system 310 and a channel 320-*b* associated with a second memory die 326 and a fourth memory die 328 of the memory system 310. In some examples, each memory die may include one or more planes 330, 331, 332, 333 (e.g., planes 165 with reference to FIG. 1) where each plane may include one or more pages 345 (e.g., pages 175 with reference to FIG. 1). As illustrated in system 300, the first memory die 325 may include a plane 330, the second memory die 326 may include plane 332, the third memory die 327 may include plane 331, and the fourth memory die 328 may include a plane 333. Further, FIG. 3 illustrates different layouts of data stored in the planes based on the type of layout used to store the information. For example, planes 330-*a*, 331-*a*, 332-*a*, and 333-*a* illustrates data stored in dual-channel little-z layout and planes 330-*b*, 331-*b*, 332-*b*, and 333-*b* illustrates data stored in dual-channel big-z layout.

In some examples, the memory system 310 may write data to the pages 345 in accordance with a big-z data layout scheme which may benefit from a sequential write operation that may take advantage of multi-channel and multi-die NAND topology. For example, the big-z layout scheme may utilize a write operation that sequentially writes data across the first and second memory dies of the memory system 310, such that each memory die may write portions of the data in parallel to respective planes. Additionally, or alternatively, the memory system 310 may write data to the planes in accordance with a little-z data layout scheme that may benefit from power saving techniques. For example, the little-z layout scheme may utilize a write operation that sequentially writes data to one memory die at a time, which may reduce the power used to transfer data to planes. Further discussion of the big-z layout scheme and the little-z layout scheme are described herein, including with reference to FIG. 4.

In some cases, using a write operation conducive to the big-z data layout may increase the write buffer size used for performing the write operation. For example, a write operation using a big-z data layout may have a first write buffer size and a write operation using the little-z data layout may have a second write buffer size, where the first write buffer size is larger than the second write buffer size. As such, using a write operation resulting in a big-z data layout may increase an amount of SRAM of the system 300 used to perform the write operation. Additionally, or alternatively, the system 300 may include different memory cell types (e.g., SLCs, MLCs, TLCs, and QLCs) where the type of memory cell may change the write buffer size for the write operation. For example, storing data to a QLC may use a buffer size greater than storing data to an SLC, an MLC, or a TLC. As such, the increase demand for SRAM may introduce undesirable complexity and may also be unsustainable for low-budget memory systems 310. Such complexity and cost problems may become further exacerbated with memory systems 310 that use QLCs for data storage.

To decrease the amount of SRAM used to perform a write operation, the memory system 310 may first write data using a little-z data layout to leverage the smaller buffer size relative to the big-z data layout. In the example of FIG. 3, the data may be divided into data portions that are the size of the page 345. Each data portion of the data may be associated with an index (e.g., 1, 2, 3, etc.). In the example of FIG. 3, the indexes may be organized to correspond to the sequential order of the data, such that the data portion that is indexed as 10 sequentially follows the data portion that is indexed as 9, which sequentially follows the data portion that is indexed as 8, and so forth.

Another aspect to highlight about this example, is the dual channel of the memory system 310. For example, the memory system 310 includes a first channel 320-*a* and a second channel 320-*b*. In some single channel environments of a memory system 310, the memory system may include only a single channel 320 (e.g., the first channel 320-*a*). In such examples where the memory system includes a single channel 320, a little-z layout may result in the data being sequentially written into a single memory die (e.g., the first memory die 325). For example, the plane 330 would include data portions 1, 2, 3, and so forth when using a little-z layout in a memory system 310 with a single channel 320. In contrast, in some multi-channel environments (such as the one illustrated in FIG. 3), a little-z layout may store data to multiple dies via multiple channels. For example, a little-z write operation using both the first channel 320-*a* and the second channel 320-*b* may write data into both the plane 330 (as illustrated using layout shown in plane 330-*a*) and the plane 332 (as illustrated using the layout shown in plane 332-*a*) as part of the write operation. As shown in the examples of planes 330-*a* and 332-*a* sequential data is distributed through both the plane 330 coupled with the first channel 320-*a* and the plane 332 coupled with the second channel 320-*b*. The techniques described herein may be used in memory systems with single channels 320 and in memory systems 310 with multiple channels 320 (as illustrated in FIG. 3). Some multi-channel memory systems 310 may use little-z formats that store data in a single die coupled with a single channel, in some cases.

In response to performing a write operation with a little-z data layout, the memory system controller 315 may first sequentially write via channel 320-*a* a first portion of the data to the first memory die 325 and third memory dies 327 (e.g., planes 330-*a* and 331-*a*) and then sequentially write via channel 320-*b* a second portion of the data to the second memory die 326 and fourth memory die 328 (e.g., planes 332-*a* and 333-*a*). As illustrated in FIG. 3, the first portion of the data may include data portions with odd indices (e.g., indices 1, 3, 5, 7, 9, and 11 to planes 330-*a* and 331-*a*) and the second portion of the data may be data portions with even indices (e.g., indices 2, 4, 6, 8, 10, and 12 to planes 332-*a* and 333-*a*). Additionally, or alternatively, the first portion of the data may include data portions with even indices and the second portion of the data may be data portions with odd indices. Additionally, or alternatively, the first portion of data may include the first half of data portion indices (e.g., indices 1-6 on planes 330-*a* and 331-*a*) and the second portion of the data may include the second half of data portions indices (e.g., data indices 7-12 on planes 332-*a* and 333-*a*).

To further decrease the write buffer size associated with the first write operation. The memory controller may first write the data to a set of non-QLC memory cells. For example, as illustrated in FIG. 3, the planes 330-*a* through 333-*a* may be associated with a first set of memory cells that have a TLC format 335. While FIG. 3 illustrates the first set of memory cells as TLC memory cells, it is understood the first set of memory cells may be a set of SLCs, in which case, the planes 330-*a* through 333-*a* may have an SLC format. Additionally, or alternatively, the first set of memory cells may be a set of MLCs, in which case, planes 330-*a* through 333-*a* may have an MLC format. In some cases, the memory cells of the memory system 310 may be examples of on-the-fly (OTF) memory cells, where a memory cell may be of a first cell type (e.g., SLC, MLC, TLC, or QLC) and may be reconfigured to a second cell type during a reconfiguration operation.

In response to writing the data to the first set of memory cells in planes 330-*a* through 333-*a*, the memory system 310 may generate an L2P mapping for the data. For example, the L2P mapping may map a logical address of a data portion (e.g., assigned by the host system 305) to a physical address of a memory cell where the data portion is stored.

In some examples, the data may remain stored in the first set of memory cells until the memory system 310 enters an idle state (e.g., within a day of the first write operation to the first set of memory cells). In some examples, the system 300 may determine the idle state in response to identifying an idle time of the memory system 310 associated with inactivity. In some examples, the idle time may be in response to the memory system 310 initiating a low power mode (e.g., a low-power run mode, a sleep mode, a low-power sleep mode, a stop mode, or a standby mode). In response to the memory system 310 entering an idle state, the memory system controller 315 may perform a transfer operation (e.g., QLC folding operation), in which the data is transferred from the first set of memory cells (e.g., at planes 330-*a* through 333-*a*) to a second set of memory cells (e.g., at planes 330-*b* through 333-*b*). In some cases, the second set of memory cells may be a set of QLCs, in which case, planes 330-*b* through 333-*b* may have a QLC format 340.

In some examples of the transfer operation, the memory system controller 315 may identify the data is stored at the first set of memory cells, where the data is associated with a first ordering in accordance with the first write operation following a little-z data layout. As such, the memory system controller 315 may read the data from planes 330-*a* through 333-*a* using a second ordering, where the second ordering is associated with a big-z data layout. For example, in the context of FIG. 3, the memory system controller 315 may read the data such that the data indices follow the order of 1, 5, 9, 13, 3, 7, 11, 15, 2, 6, 10, 14, 4, 8, 12, 16. As such, the memory system controller 315 may perform, using the second ordering, a second write operation to the second set of memory cells (e.g., at planes 330-*b* through 333-*b*). In some examples, the second write operation may have the little-z data layout (e.g., indices 1, 5, 9, and 13 written to plane 330-*b*, indices 3, 7, 11, and 15 written to plane 331-*b*, indices 2, 6, 10, and 14 written to plane 332-*b*, and indices 4, 8, 12, and 16 written to plane 333-*b*).

In some examples of the transfer operation, the memory system controller 315 may identify the data is stored at the first set of memory cells, where the data is associated with the first ordering in accordance with the first write operation following a little-z data layout. In such examples, the memory system controller 315 may read the data from planes 330-*a* through 333-*a* using the first ordering. Upon receiving the data at the memory system controller 315, the memory system controller 315 may reorder the data to the second ordering associated with the big-z data layout. For example, in the context of FIG. 3, the memory system controller 315 may reorder the data such that the data indices follow the order of 1, 5, 9, 13, 3, 7, 11, 15, 2, 6, 10, 14, 4, 8, 12, 16. As such, the memory system controller 315 may perform, using the second ordering, a second write operation to the second set of memory cells (e.g., at planes 330-*b* through 333-*b*). In some examples, the second write operation may have the little-z data layout (e.g., indices 1, 5, 9, and 13 written to plane 330-*b*, indices 3, 7, 11, and 15 written to plane 331-*b*, indices 2, 6, 10, and 14 written to plane 332-*b*, and indices 4, 8, 12, and 16 written to plane 333-*b*).

In some examples of the transfer operation, the memory controller may identify the data is stored at the first set of memory cells, where the data is associated with the first ordering in accordance with the first write operation following a little-z data layout. In such examples, the memory system controller 315 may read the data from planes 330-*a* through 333-*a* using the first ordering. Upon receiving the data, the memory system controller 315 may perform a second write operation to the second set of memory cells (e.g., at planes 330-*b* through 333-*b*). In some examples, the second write operation may have the little-z data layout, and the data may be written using the second order. For example, in the context of FIG. 3, the memory system controller 315 may write the data such that the data indices follow the order of 1, 5, 9, 13, 3, 7, 11, 15, 2, 6, 10, 14, 4, 8, 12, 16. As such indices 1, 5, 9, and 13 may be written to plane 330-*b*, indices 3, 7, 11, and 15 may be written to plane 331-*b*, indices 2, 6, 10, and 14 may be written to plane 332-*b*, and indices 4, 8, 12, and 16 may be written to plane 333-*b*.

In accordance with performing the transfer operation, the data stored at the second set of memory cells may be read using a read operation that has a big-z layout. For example, the host system controller 306 may transmit a read command for the data, and as such, the memory system controller 315 may perform the read operation while taking advantage of the multi-channel and multi-die NAND topology of system 300 (e.g., read data from planes 330-*b* through 333-*b* across the four memory dies in parallel via channels 320-*a* and 320-*b*). As such, the system 300 may benefit from both an increased reading efficiency associated with the big-z data layout of the second set of memory cells and the decreased write buffer size associated with write operations performed on the first set of memory cells.

In some examples, the system 300 may update the L2P mapping in response to transferring the data from the first set of memory cells to the second set of memory cells. For example, the logical addresses associated with the data (e.g., as provided by the host system 305) may be updated from the physical addresses of the first set of memory cells to the physical address of the second set of memory cells. In some examples, the second set of memory cells may be associated with one or more memory blocks. In such examples, the system 300 may update the L2P mapping for memory cells of the second set of memory cells that are part of a memory block that is full.

In some examples, the memory system 310 may perform a second transfer operation (e.g., a second QLC folding operation). In such examples, the memory system 310 may transfer the data stored to the second set of memory cells to a third set of memory cells, where the third set of memory cells may also be a set of QLCs. As such, the second transfer operation may be an example of a data refresh operation in which the data is moved to another set of QLC cells. In some cases, during each transfer operation, the memory system controller 315 may perform a data error correction operation. For example, during a transfer operation, the memory system controller 315 may identify one or more errors associated with the data and correct the one or more errors in response to identifying.

Figure 4A:
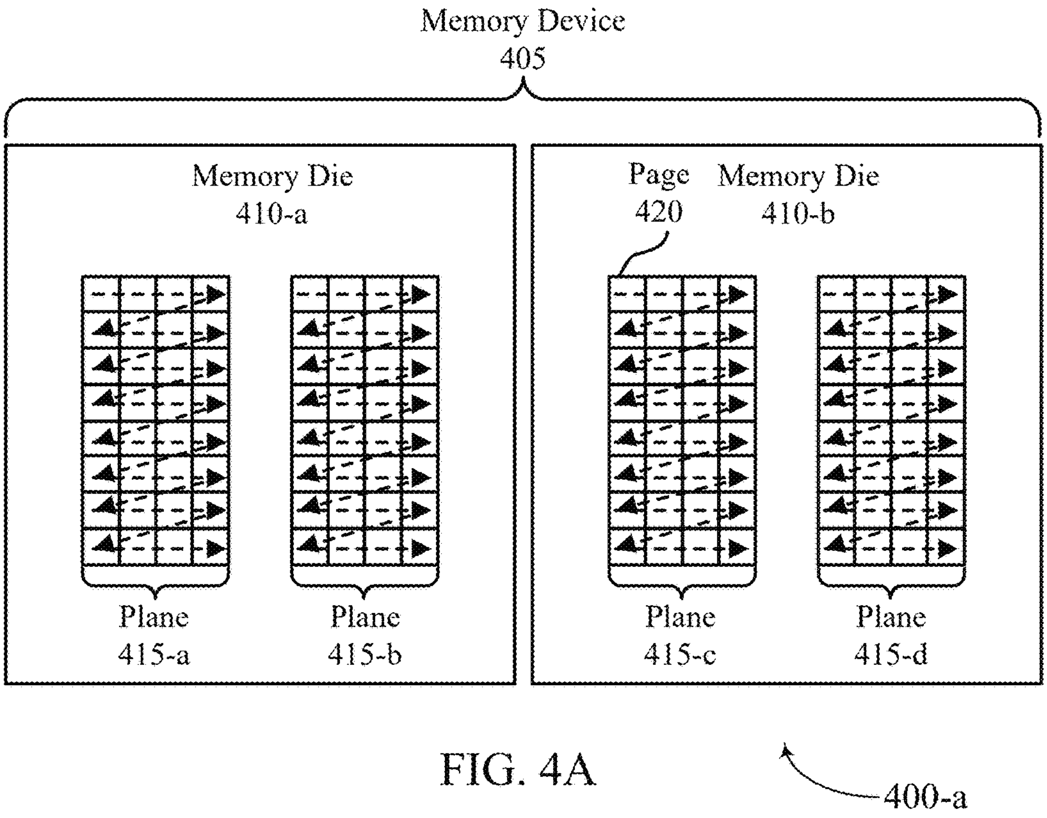
FIGS. 4A and 4B illustrate examples of a data layout schemes that supports data layout configurations for access operations in accordance with examples as disclosed herein.
Figure 4B:
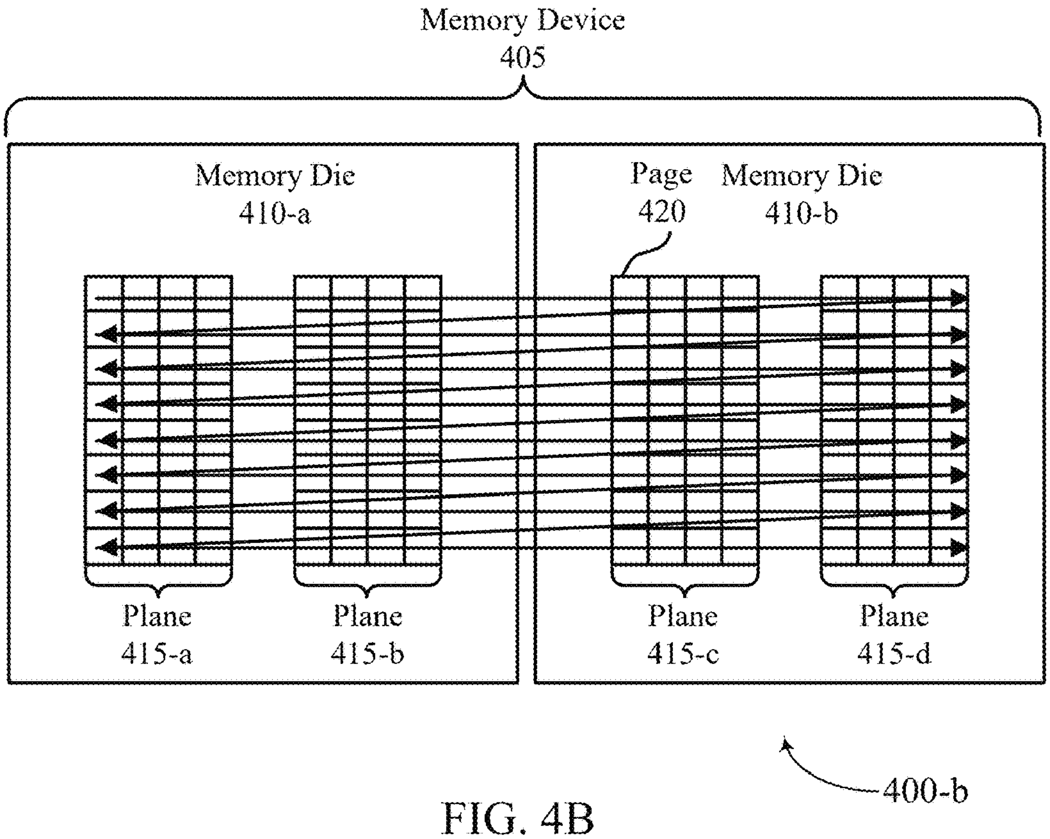

FIGS. 4A and 4B illustrate examples of data layout schemes 400-*a* and 400-*b* that support data layout configurations for access operations in accordance with examples as disclosed herein. In some examples, the data layout schemes 400 may be implemented by one or more aspects of systems 100 through 300. For instance, the data layout schemes 400 may be implemented by a memory system 110 and host system 105 as described with reference to FIG. 1, memory system 210 and host system 205 as described with reference to FIG. 2, or memory system 310 and host system 305 as described with reference to FIG. 3. Additionally, or alternatively, memory device 405 may be an example of a memory device 130, memory dies 410 may be examples of dies 160, planes 415 may be examples of planes 165, and pages 420 may be examples of a pages 175, with reference to FIG. 1.

FIG. 4A may illustrate an example of a little-z data layout (e.g., as described in FIG. 3). As illustrated in FIG. 4A, a write operation using a little-z data layout may write data sequentially on a die-per-die basis of the memory device 405. For example, a memory system controller may first write data to memory die 410-*a* starting at the first page 420 of a plane 415-*a*. In response to filling plane 415-*a*, the memory system controller may write data to plane 415-*b*. In response to filling both planes 415-*a* and 415-*b* of memory die 410-*a*, the memory system controller may start sequentially writing data to planes 415-*c* and 415-*d* a memory die 410-*b*. In such examples, data will be stored sequentially within a same plane, but not across different planes. Such layouts may limit the amount of data that can be written sequentially and also limit the amount of data that can be read sequentially. A little-z layout may map data sequentially to different physical addresses (e.g., pages) in a single plane (for a single-channel memory system). In some examples, the write buffer associated with a first write operation using a little-z data layout may have a size that is smaller than a second write operation using a big-z data layout. In accordance with the smaller relative buffer size, a memory system using a little-z data layout may benefit from a decrease in SRAM used for writing operations. Additionally, or alternatively, the little-z data layout may decrease power expenditure of the memory system in response to writing and reading data to and from one memory die 410 at a time.

FIG. 4B may illustrate an example of a big-z data layout (e.g., as described in FIG. 3). As illustrated in FIG. 4B, a write operation using a big-z data layout may write data sequentially across multiple dies of the memory device 405. For example, a write operation using a big-z data layout may start by writing to a first page 420 of plane 415-*a* and sequentially write across planes 415-*a* through 415-*d*. By writing across multiple memory dies 410 and/or multiple planes, the memory system may benefit from an increase in writing speed for a given write operation. Additionally, or alternatively, reading operations using a big-z data layout may benefit from increased reading speeds. For example, because a larger chunk of data can be written sequentially, the compression of an L2P mapping may be larger, which may result in less transfers of the L2P mapping between the SRAM and the NAND.

In some cases, a memory system may achieve a read operation using a big-z data layout by first performing a write operation that uses big-z data layout. A big-z layout may map data sequentially to different physical addresses (e.g., pages) in a multiple planes (for a single-channel memory system). In some cases, using a write operation that uses a big-z data layout may increase the write buffer size which may increase the amount of SRAM used to perform the write operation. Additionally, or alternatively, a write operation that writes data to a set of QLCs may use larger buffer size relative to a write operation that writes data to a set of SLCs, MLCs, or TLCs. As such, a memory system may decrease SRAM occupancy by first writing data to a set lower level memory cells (e.g., SLCs, MLCs, or TLCs) using a write operation with the little-z data layout illustrated in FIG. 4A. As such, during an idle time of the memory system, the data stored to the set of lower level memory cells may be transferred to a set of higher level memory cells (e.g., QLCs). To further reduce the buffer size for the write operation, the transfer operation may use a second write operation that has the little-z data layout. The data in the write operations that use the little-z layout (e.g., as illustrated in FIG. 4A) may be organized in such a way that the resulting data stored in the QCL blocks may be a big-z layout (e.g., as illustrated in FIG. 4B) for future read operation.

In accordance with performing the transfer operation, the data may be read from the set of QLCs in accordance with a big-z data layout. By performing a read operation using a big-z data layout, the memory system may take advantage of multi-die NAND topology by concurrently reading data across the multiple memory dies 410 which may increase the reading speed.

Figure 5:
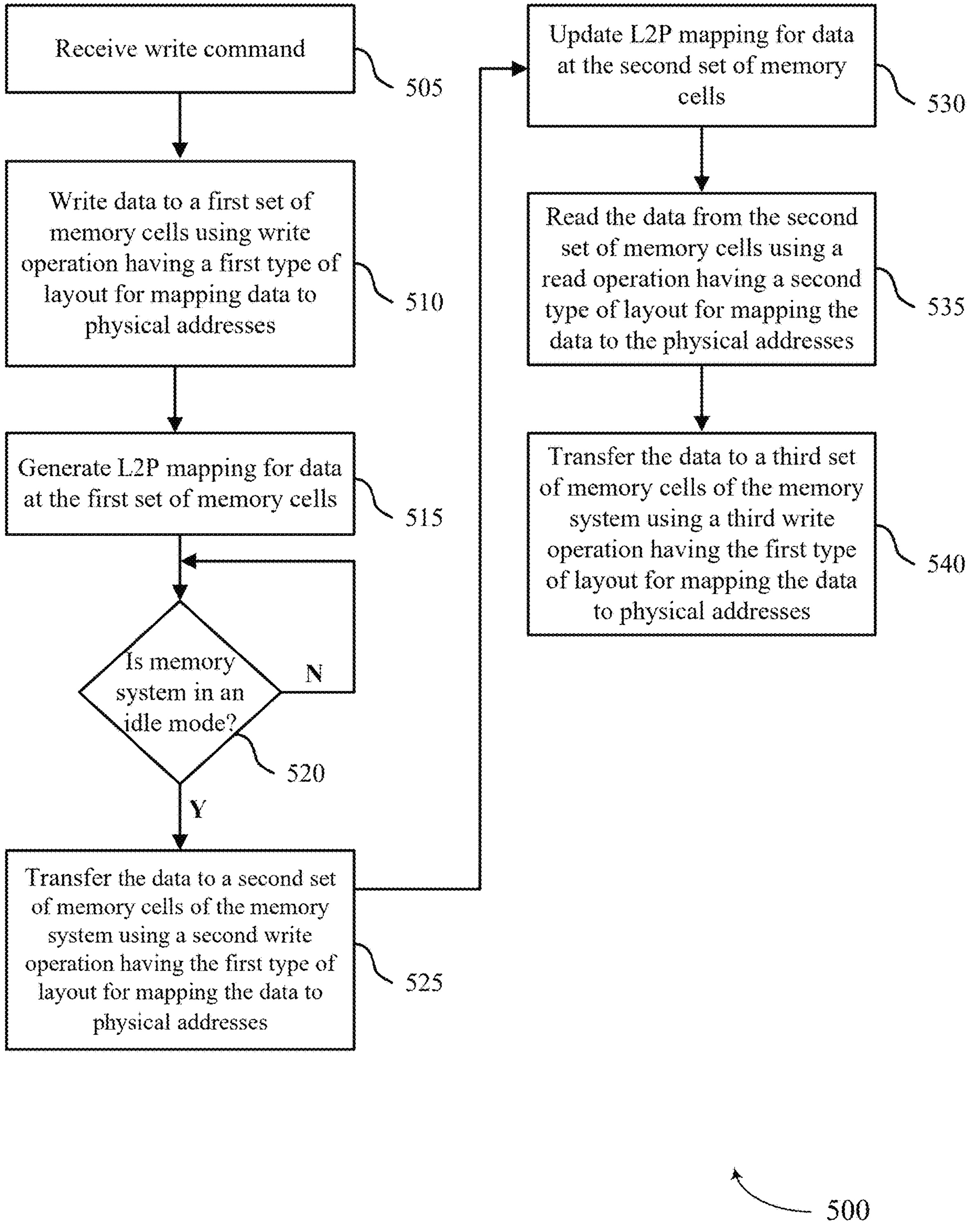
FIG. 5 illustrates an example of a process flow that supports data layout configurations for access operations in accordance with examples as disclosed herein.

FIG. 5 illustrates an example of a process flow 500 that supports data layout configurations for access operations in accordance with examples as disclosed herein. In some examples, process flow 500 may be implemented by one or more aspects of systems 100 through 300. For instance, process flow 500 may be implemented by a memory system 110 as described with reference to FIG. 1, a memory system 210 as described with reference to FIG. 2, or a memory system 310 as described with reference to FIG. 3. In some examples, process flow 500 may correspond to one or more types of writing and reading operations that utilize different data layouts (e.g., little-z data layouts and big-z data layouts) with reference to FIGS. 3 and 4. Aspects of the process flow 500 may be implemented by a controller, among other components. Additionally, or alternatively, aspects of the process flow 500 may be implemented as instructions stored in memory (e.g., firmware stored in a memory coupled with a controller). For example, the instructions, in response to being executed by a controller (e.g., the memory system controller 115), may cause the controller to perform the operations of the process flow 500.

At 505, a write command may be received. For example, a memory system (e.g., a memory system 110) receives a write command from a host system (e.g., a host system 105) to write data to the memory system.

At 510, data may be written to a first set of memory cells. For example, a memory system controller of the memory system (e.g., the memory system controller 115) may write the data to a first set of memory cells of the memory system using a first write operation having a first type of layout (e.g., little-z data layout) for mapping the data to physical addresses of the memory system in response to receiving the write command. In some instances, the first set of memory cells may be written to as SLCs, MLCs, or TLCs.

At 515, an L2P mapping may be generated. For example, the memory system may generate an L2P mapping that maps one or more logical addresses to one or more first physical addresses of the memory system associated with the first set of memory cells.

At 520, an idle mode of the memory system may be identified. For example, the memory system may identify an idle time associated with inactivity of the memory system. In some examples, the memory system may identify the idle time in response to the memory system initiating a low power mode.

If at 520, an idle mode is identified, then at 525 the data may be transferred to a second set of memory cells. The second set of memory cells may be a higher level of memory cells (e.g., QLC if the first set of memory cells are TLC or below). In some examples, this transfer operation may be referred to as a folding operation or a QLC folding operation. For example, the memory system controller may transfer, using a transfer operation, the data to a second set of memory cells of the memory system using a second write operation having the first type of layout for mapping the data to physical addresses of the memory system. In some instances, the second set of memory cells may be written to as QLCs. In some examples, performing the transfer operation may be in response to the memory system identifying the idle time.

In some examples of the transfer operation, the memory system controller may identify the data stored at the first set of memory cells, where the data may be stored in the memory system according to a first ordering in accordance with the first type of layout used by the first write operation. The memory system controller may read the data from the first set of memory cells. The memory system may then order the data in such a way that write operations may use a little-z format, but the data stored in the memory system may be in a big-z format. The data then may be read using future read operation using the big-z layout. Such techniques may allow the memory system realize the advantages of writing immediately to TLC (e.g., which is faster than writing to QLC directly), writing to QLC cells using a little-z format (e.g., uses a smaller write buffer), and then reading data from QLC cells using a big-z format (e.g., which can be faster than reading with a small-z format). For example, a write operation may use a little-z format, but the data in the little-z format may be organized in a non-sequential manner, such that multiple little-z write operations may result in the data being organized in a big-z format with the QLC blocks. The ordering that the memory system uses for in the little-z formats to write to the QLC cells may be referred to as a second ordering, where the second ordering may be associated with a second type of layout (e.g., big-z data layout). As such, the memory system controller may write, using the second ordering, the data to the second set of memory cells of the memory system using the second write operation having the first type of layout (e.g., little-z).

In some examples, to do this re-ordering as part of the transfer operation, the memory system controller may read the data from the first set of memory cells using a second ordering. The memory system controller may write, using the second ordering, the data to the second set of memory cells of the memory system using the second write operation having the first type of layout.

Additionally or alternatively, to do this re-ordering as part of the transfer operation, the memory system controller may read the data from the first set of memory cells using the first ordering. As such, the memory system controller may reorder the data from the first ordering to a second ordering, where the second ordering is associated with the second type of layout. The memory system controller may write, using the second ordering, the data to the second set of memory cells of the memory system using the second write operation having the first type of layout.

Additionally or alternatively, to do this re-ordering as part of the transfer operation, the memory system controller may read the data from the first set of memory cells using the first ordering. As such, the memory system controller may write the data to the second set of memory cells of the memory system using the second write operation having the first type of layout, where the second ordering may be associated with the second type of layout.

In some cases, as part of the transfer operation, the memory system controller may identify one or more errors associated with the data correct the one or more errors in response to identifying. Thus, the transfer operation may be used to ensure the quality of the data stored in the QLC blocks.

At 530, the L2P mapping may be updated. For examples, the memory system may update the L2P mapping to map the one or more logical addresses to one or more second physical addresses of the memory system associated with the second set of memory cells in response to transferring the data to the second set of memory cells. In some examples, updating the L2P mapping to the one or more second physical addresses may be in response to the second set of memory cells being associated with a block of memory cells that is full.

At 535, the data may be read. For example, the memory system controller may read, the data from the second set of memory cells using a read operation having the second type of layout for mapping the data to the physical addresses of the memory system different than the first type of layout.

At 540, the data may be transferred using a second transfer operation. For example, the memory system controller may transfer, using the second transfer operation, the data to a third set of memory cells of the memory system using a third write operation having the first type of layout for mapping the data to physical addresses of the memory system. In some examples, the third set of memory cells may be written to as QLCs.

In some examples, the data stored using the first type of layout may be organized sequentially in one memory die of the memory system and the data stored using the second type of layout may be organized sequentially across multiple memory dies of the memory system. In some examples, the first write operation may be associated with a first buffer size in accordance with having the first type of layout, and the read operation may be associated with a second buffer size in accordance with having the second type of layout, the second buffer size being greater than the first buffer size.

Figure 6:
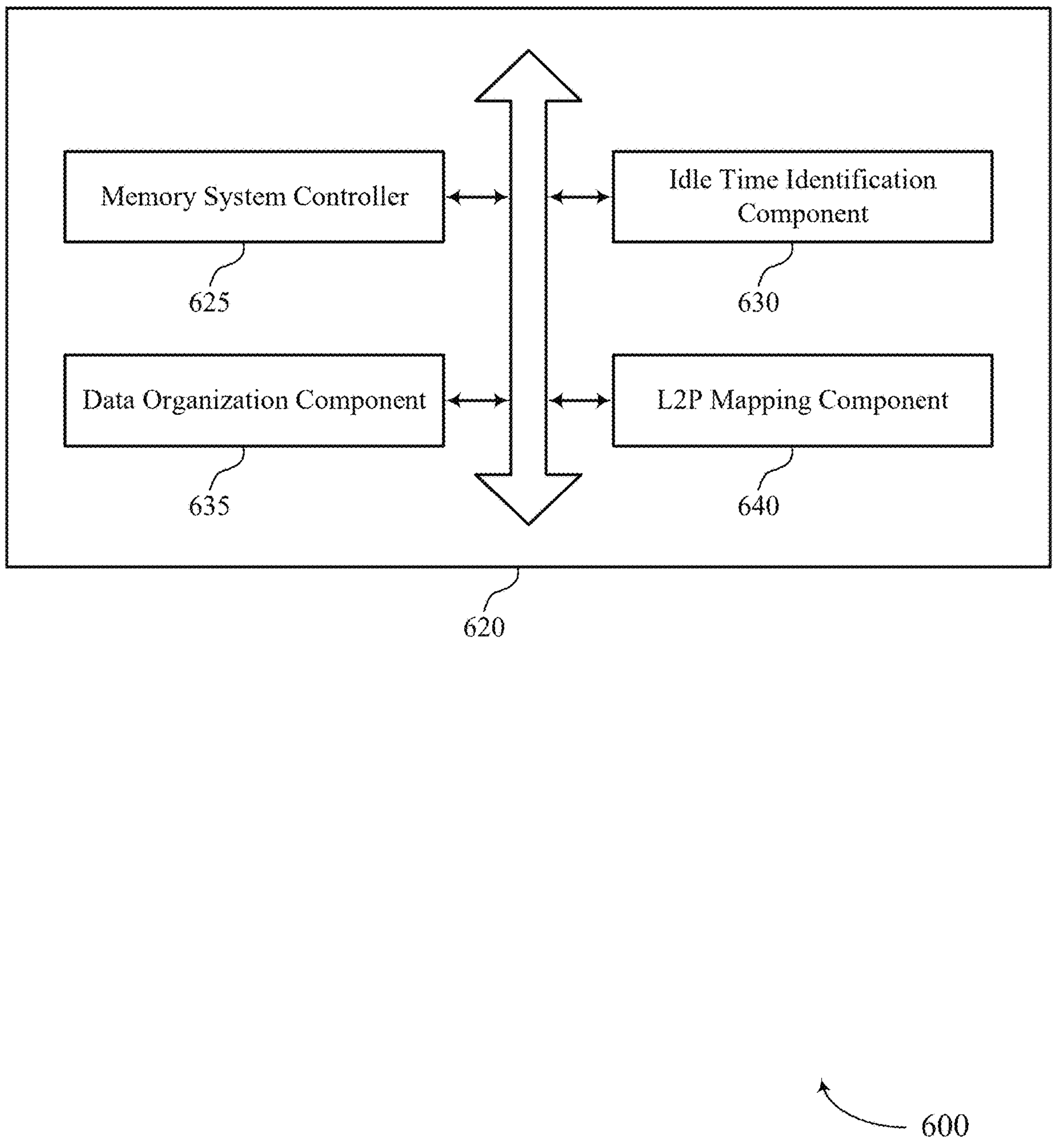
FIG. 6 shows a block diagram of a memory system that supports data layout configurations for access operations in accordance with examples as disclosed herein.

FIG. 6 shows a block diagram 600 of a memory system 620 that supports data layout configurations for access operations in accordance with examples as disclosed herein. The memory system 620 may be an example of aspects of a memory system as described with reference to FIGS. 1 through 5. The memory system 620, or various components thereof, may be an example of means for performing various aspects of data layout configurations for access operations as described herein. For example, the memory system 620 may include a memory system controller 625, an idle time identification component 630, a data organization component 635, a L2P mapping component 640, or any combination thereof. Each of these components may communicate, directly or indirectly, with one another (e.g., via one or more buses).

The memory system controller 625 may be configured as or otherwise support a means for receiving a write command to write data to a memory system. In some examples, the memory system controller 625 may be configured as or otherwise support a means for writing the data to a first set of memory cells of the memory system using a first write operation having a first type of layout for mapping the data to physical addresses of the memory system based at least in part on receiving the write command, where the first set of memory cells are written to as single-level cells, multi-level cells, or triple-level cells. In some examples, the memory system controller 625 may be configured as or otherwise support a means for transferring, using a transfer operation, the data to a second set of memory cells of the memory system using a second write operation having the first type of layout for mapping the data to physical addresses of the memory system, where the second set of memory cells are written to as quad-level cells. In some examples, the memory system controller 625 may be configured as or otherwise support a means for reading, based at least in part on transferring the data, the data from the second set of memory cells using a read operation having a second type of layout for mapping the data to the physical addresses of the memory system different than the first type of layout.

In some examples, the idle time identification component 630 may be configured as or otherwise support a means for identifying an idle time associated with inactivity of the memory system, where transferring, using the transfer operation, the data to the second set of memory cells of the memory system is based at least in part on identifying the idle time.

In some examples, the idle time is based at least in part on the memory system initiating a low power mode.

In some examples, the data stored using the first type of layout is organized sequentially in one memory die of the memory system. In some examples, the data stored using the second type of layout is organized sequentially across multiple memory dies of the memory system.

In some examples, the first write operation is associated with a first buffer size based at least in part on having the first type of layout. In some examples, the read operation is associated with a second buffer size based at least in part on having the second type of layout, the second buffer size being greater than the first buffer size.

In some examples, to support transferring the data using the transfer operation, the memory system controller 625 may be configured as or otherwise support a means for identifying the data stored at the first set of memory cells, where the data is stored in the memory system according to a first ordering based at least in part on the first type of layout used by the first write operation. In some examples, to support transferring the data using the transfer operation, the memory system controller 625 may be configured as or otherwise support a means for reading, to a controller of the memory system, the data from the first set of memory cells using a second ordering, where the second ordering is associated with the second type of layout. In some examples, to support transferring the data using the transfer operation, the memory system controller 625 may be configured as or otherwise support a means for writing, using the second ordering, the data to the second set of memory cells of the memory system using the second write operation having the first type of layout.

In some examples, to support transferring the data using the transfer operation, the memory system controller 625 may be configured as or otherwise support a means for identifying the data stored at the first set of memory cells, where the data is stored in the memory system according to a first ordering based at least in part on the first type of layout used by the first write operation. In some examples, to support transferring the data using the transfer operation, the memory system controller 625 may be configured as or otherwise support a means for reading, to a controller of the memory system, the data from the first set of memory cells using the first ordering. In some examples, to support transferring the data using the transfer operation, the memory system controller 625 may be configured as or otherwise support a means for reordering, at the controller, the data from the first ordering to a second ordering, where the second ordering is associated with the second type of layout. In some examples, to support transferring the data using the transfer operation, the memory system controller 625 may be configured as or otherwise support a means for writing, using the second ordering, the data to the second set of memory cells of the memory system using the second write operation having the first type of layout.

In some examples, to support transferring the data using the transfer operation, the memory system controller 625 may be configured as or otherwise support a means for identifying the data stored at the first set of memory cells, where the data is stored in the memory system according to a first ordering based at least in part on the first type of layout used by the first write operation. In some examples, to support transferring the data using the transfer operation, the memory system controller 625 may be configured as or otherwise support a means for reading, to a controller of the memory system, the data from the first set of memory cells using the first ordering. In some examples, to support transferring the data using the transfer operation, the memory system controller 625 may be configured as or otherwise support a means for writing, using a second ordering, the data to the second set of memory cells of the memory system using the second write operation having the first type of layout, where the second ordering is associated with the second type of layout.

In some examples, to support transferring the data using the transfer operation, the memory system controller 625 may be configured as or otherwise support a means for identifying, at a controller of the memory system, one or more errors associated with the data. In some examples, to support transferring the data using the transfer operation, the memory system controller 625 may be configured as or otherwise support a means for correcting, at the controller, the one or more errors based at least in part on identifying.

In some examples, the L2P mapping component 640 may be configured as or otherwise support a means for generating a logical-to-physical mapping that maps one or more logical addresses to one or more first physical addresses of the memory system associated with the first set of memory cells. In some examples, the L2P mapping component 640 may be configured as or otherwise support a means for updating the logical-to-physical mapping to map the one or more logical addresses to one or more second physical addresses of the memory system associated with the second set of memory cells based at least in part on transferring the data to the second set of memory cells.

In some examples, updating the logical-to-physical mapping to the one or more second physical addresses is based at least in part on the second set of memory cells including a block of memory cells that is full.

In some examples, the memory system controller 625 may be configured as or otherwise support a means for transferring, using a second transfer operation, the data to a third set of memory cells of the memory system using a third write operation having the first type of layout for mapping the data to physical addresses of the memory system, where the third set of memory cells are written to as quad-level cells.

Figure 7:
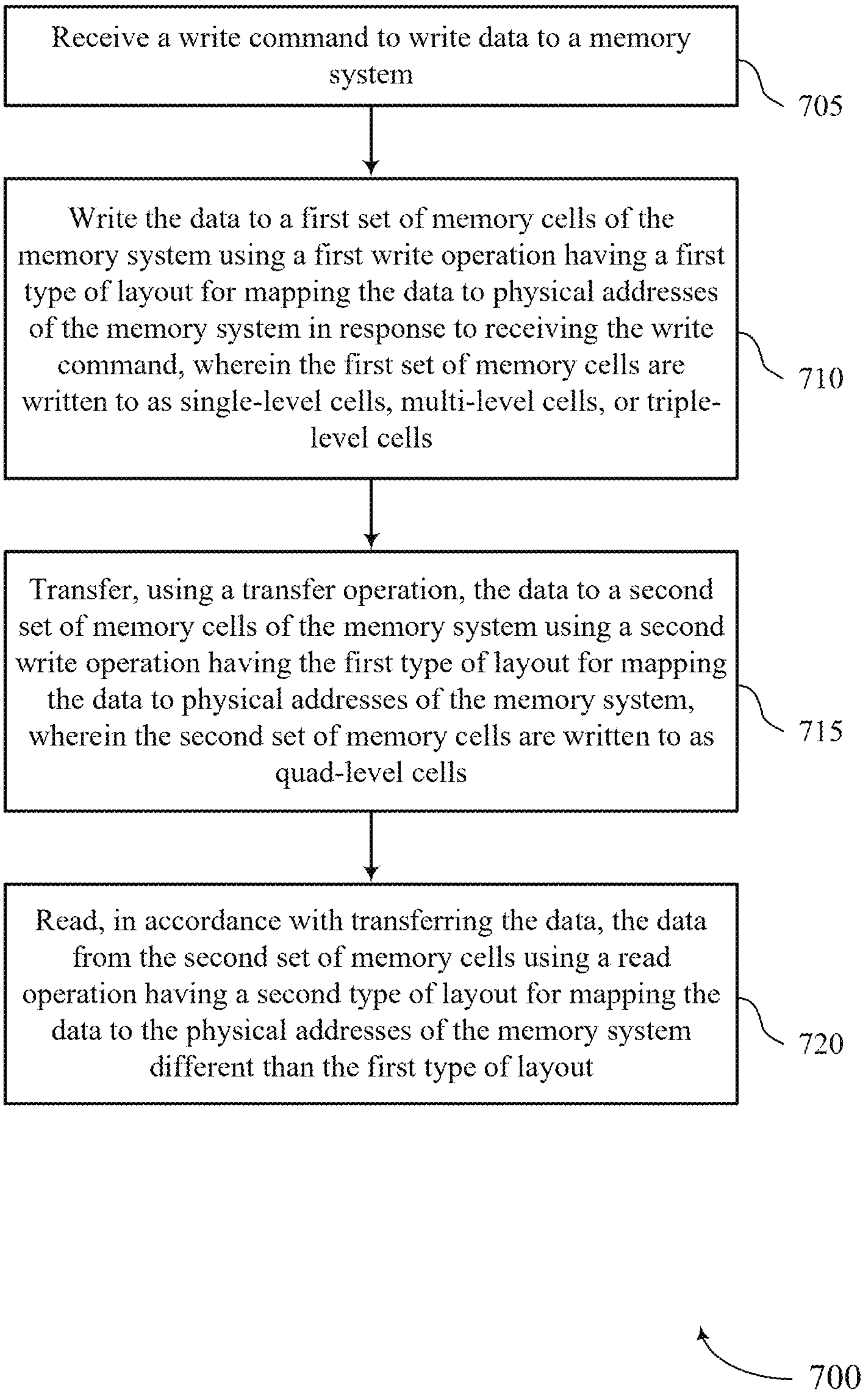
FIG. 7 shows a flowchart illustrating a method or methods that support data layout configurations for access operations in accordance with examples as disclosed herein.

FIG. 7 shows a flowchart illustrating a method 700 that supports data layout configurations for access operations in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving a write command to write data to a memory system. The operations of 705 may be performed in accordance with examples as disclosed herein. In some examples, aspects of the operations of 705 may be performed by a memory system controller 625 as described with reference to FIG. 6.

At 710, the method may include writing the data to a first set of memory cells of the memory system using a first write operation having a first type of layout for mapping the data to physical addresses of the memory system based at least in part on receiving the write command, where the first set of memory cells are written to as single-level cells, multi-level cells, or triple-level cells. The operations of 710 may be performed in accordance with examples as disclosed herein. In some examples, aspects of the operations of 710 may be performed by a memory system controller 625 as described with reference to FIG. 6.

At 715, the method may include transferring, using a transfer operation, the data to a second set of memory cells of the memory system using a second write operation having the first type of layout for mapping the data to physical addresses of the memory system, where the second set of memory cells are written to as quad-level cells. The operations of 715 may be performed in accordance with examples as disclosed herein. In some examples, aspects of the operations of 715 may be performed by a memory system controller 625 as described with reference to FIG. 6.

At 720, the method may include reading, based at least in part on transferring the data, the data from the second set of memory cells using a read operation having a second type of layout for mapping the data to the physical addresses of the memory system different than the first type of layout. The operations of 720 may be performed in accordance with examples as disclosed herein. In some examples, aspects of the operations of 720 may be performed by a memory system controller 625 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a write command to write data to a memory system; writing the data to a first set of memory cells of the memory system using a first write operation having a first type of layout for mapping the data to physical addresses of the memory system based at least in part on receiving the write command, where the first set of memory cells are written to as single-level cells, multi-level cells, or triple-level cells; transferring, using a transfer operation, the data to a second set of memory cells of the memory system using a second write operation having the first type of layout for mapping the data to physical addresses of the memory system, where the second set of memory cells are written to as quad-level cells; and reading, based at least in part on transferring the data, the data from the second set of memory cells using a read operation having a second type of layout for mapping the data to the physical addresses of the memory system different than the first type of layout.

Aspect 2: The method, apparatus, or non-transitory computer-readable medium of aspect 1, further including operations, features, circuitry, logic, means, or instructions, or any combination thereof for identifying an idle time associated with inactivity of the memory system, where transferring, using the transfer operation, the data to the second set of memory cells of the memory system is based at least in part on identifying the idle time.

Aspect 3: The method, apparatus, or non-transitory computer-readable medium of aspect 2, where the idle time is based at least in part on the memory system initiating a low power mode.

Aspect 4: The method, apparatus, or non-transitory computer-readable medium of any of aspects 1 through 3, where the data stored using the first type of layout is organized sequentially in one memory die of the memory system and the data stored using the second type of layout is organized sequentially across multiple memory dies of the memory system.

Aspect 5: The method, apparatus, or non-transitory computer-readable medium of any of aspects 1 through 4, where the first write operation is associated with a first buffer size based at least in part on having the first type of layout and the read operation is associated with a second buffer size based at least in part on having the second type of layout, the second buffer size being greater than the first buffer size.

Aspect 6: The method, apparatus, or non-transitory computer-readable medium of any of aspects 1 through 5, where transferring the data using the transfer operation further includes operations, features, circuitry, logic, means, or instructions, or any combination thereof for identifying the data stored at the first set of memory cells, where the data is stored in the memory system according to a first ordering based at least in part on the first type of layout used by the first write operation; reading, to a controller of the memory system, the data from the first set of memory cells using a second ordering, where the second ordering is associated with the second type of layout; and writing, using the second ordering, the data to the second set of memory cells of the memory system using the second write operation having the first type of layout.

Aspect 7: The method, apparatus, or non-transitory computer-readable medium of any of aspects 1 through 6, where transferring the data using the transfer operation further includes operations, features, circuitry, logic, means, or instructions, or any combination thereof for identifying the data stored at the first set of memory cells, where the data is stored in the memory system according to a first ordering based at least in part on the first type of layout used by the first write operation; reading, to a controller of the memory system, the data from the first set of memory cells using the first ordering; reordering, at the controller, the data from the first ordering to a second ordering, where the second ordering is associated with the second type of layout; and writing, using the second ordering, the data to the second set of memory cells of the memory system using the second write operation having the first type of layout.

Aspect 8: The method, apparatus, or non-transitory computer-readable medium of any of aspects 1 through 7, where transferring the data using the transfer operation further includes operations, features, circuitry, logic, means, or instructions, or any combination thereof for identifying the data stored at the first set of memory cells, where the data is stored in the memory system according to a first ordering based at least in part on the first type of layout used by the first write operation; reading, to a controller of the memory system, the data from the first set of memory cells using the first ordering; and writing, using a second ordering, the data to the second set of memory cells of the memory system using the second write operation having the first type of layout, where the second ordering is associated with the second type of layout.

Aspect 9: The method, apparatus, or non-transitory computer-readable medium of any of aspects 1 through 8, where transferring the data using the transfer operation further includes operations, features, circuitry, logic, means, or instructions, or any combination thereof for identifying, at a controller of the memory system, one or more errors associated with the data and correcting, at the controller, the one or more errors based at least in part on identifying.

Aspect 10: The method, apparatus, or non-transitory computer-readable medium of any of aspects 1 through 9, further including operations, features, circuitry, logic, means, or instructions, or any combination thereof for generating a logical-to-physical mapping that maps one or more logical addresses to one or more first physical addresses of the memory system associated with the first set of memory cells and updating the logical-to-physical mapping to map the one or more logical addresses to one or more second physical addresses of the memory system associated with the second set of memory cells based at least in part on transferring the data to the second set of memory cells.

Aspect 11: The method, apparatus, or non-transitory computer-readable medium of aspect 10, where updating the logical-to-physical mapping to the one or more second physical addresses is based at least in part on the second set of memory cells including a block of memory cells that is full.

Aspect 12: The method, apparatus, or non-transitory computer-readable medium of any of aspects 1 through 11, further including operations, features, circuitry, logic, means, or instructions, or any combination thereof for transferring, using a second transfer operation, the data to a third set of memory cells of the memory system using a third write operation having the first type of layout for mapping the data to physical addresses of the memory system, where the third set of memory cells are written to as quad-level cells.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a controller configured to couple with a memory system, wherein the controller is configured to cause the apparatus to:

write data to a first set of memory cells of the memory system using a first write operation having a first type of layout for mapping the data to physical addresses of the memory system;

transfer, using a transfer operation, the data to a second set of memory cells of the memory system using a second write operation having the first type of layout for mapping the data to the physical addresses of the memory system; and read, based at least in part on transferring the data, the data from the second set of memory cells using a read operation having a second type of layout for mapping the data to the physical addresses of the memory system.

2. The apparatus of claim 1, wherein the controller is further configured to cause the apparatus to:

receive a write command to write the data to the memory system, wherein writing the data is based at least in part on receiving the write command.

3. The apparatus of claim 1, wherein the controller is further configured to cause the apparatus to:

identify an idle time associated with the memory system, wherein transferring, using the transfer operation, the data to the second set of memory cells of the memory system is based at least in part on identifying the idle time.

4. The apparatus of claim 1, wherein the controller is further configured to cause the apparatus to:

initiate a low power mode associated with the memory system, wherein transferring, using the transfer operation, the data to the second set of memory cells of the memory system is based at least in part on initiating the low power mode.

5. The apparatus of claim 1, wherein the first set of memory cells are written to as single-level cells, multi-level cells, or triple-level cells.

6. The apparatus of claim 1, wherein the second set of memory cells are written to as quad-level cells.

7. The apparatus of claim 1, wherein the second type of layout for mapping is different than the first type of layout.

8. An apparatus, comprising:
a controller configured to couple with a memory system, wherein the controller is configured to cause the apparatus to:
transfer data from a first set of memory cells and to a second set of memory cells of the memory system using a first write operation having a first type of layout for mapping the data to physical addresses of the memory system;
identify the data stored at the first set of memory cells, wherein the data is stored according to a first ordering;
read the data from the first set of memory cells using a second ordering, wherein the second ordering is associated with a second type of layout for mapping the data to the physical addresses of the memory system; and
write, using the second ordering, the data to the second set of memory cells of the memory system using the first write operation having the first type of layout.

9. The apparatus of claim 8, wherein the controller is further configured to cause the apparatus to:
receive a write command to write the data to the memory system prior to transferring the data from the first set of memory cells and to the second set of memory cells of the memory system.

10. The apparatus of claim 8, wherein the controller is further configured to cause the apparatus to:
write the data to the first set of memory cells of the memory system using a second write operation having the first type of layout for mapping the data to the physical addresses of the memory system, wherein transferring the data is based at least in part on writing the data to the first set of memory cells.

11. The apparatus of claim 8, wherein the first ordering is based at least in part on the first type of layout used by the first write operation.

12. The apparatus of claim 8, wherein the first set of memory cells are written to as single-level cells, multi-level cells, or triple-level cells, and wherein the second set of memory cells are written to as quad-level cells.

13. The apparatus of claim 8, wherein:
the data stored using the first type of layout is organized sequentially in one memory die of the memory system; and
the data stored using the second type of layout is organized sequentially across multiple memory dies of the memory system.

14. An apparatus, comprising:
a controller configured to couple with a memory system, wherein the controller is configured to cause the apparatus to:
transfer data from a first set of memory cells and to a second set of memory cells of the memory system using a first write operation having a first type of layout for mapping the data to physical addresses of the memory system;
identify the data stored at the first set of memory cells, wherein the data is stored in the memory system according to a first ordering;
read the data from the first set of memory cells using the first ordering; and
write, using a second ordering, the data to the second set of memory cells of the memory system using a second write operation having the first type of layout.

15. The apparatus of claim 14, wherein the controller is further configured to cause the apparatus to:
reorder the data from the first ordering to the second ordering based at least in part on reading the data.

16. The apparatus of claim 14, wherein the second ordering is associated with a second type of layout.

17. The apparatus of claim 14, wherein the controller is further configured to cause the apparatus to:
receive a write command to write the data to the memory system prior to transferring the data from the first set of memory cells and to the second set of memory cells of the memory system.

18. The apparatus of claim 15, wherein the controller is further configured to cause the apparatus to:
write the data to the first set of memory cells of the memory system using a second write operation having the first type of layout for mapping the data to the physical addresses of the memory system, wherein transferring the data is based at least in part on writing the data to the first set of memory cells.

19. The apparatus of claim 14, wherein the first ordering is based at least in part on the first type of layout used by the first write operation.

20. The apparatus of claim 14, wherein the first set of memory cells are written to as single-level cells, multi-level cells, or triple-level cells, and wherein the second set of memory cells are written to as quad-level cells.

* * * * *